United States Patent [19]

Shaffer

[11] 4,210,107
[45] Jul. 1, 1980

[54] TUNEABLE INTAKE MANIFOLD

[76] Inventor: Donald J. Shaffer, Box 88, Upper Strasburg, Pa. 17265

[21] Appl. No.: 19,930

[22] Filed: Mar. 12, 1979

Related U.S. Application Data

[63] Continuation of Ser. No. 760,402, Jan. 18, 1977, abandoned.

[51] Int. Cl.² .............................. F02B 17/18
[52] U.S. Cl. .................. 123/52 M; 123/52 MB; 123/52 MV
[58] Field of Search ......... 123/52 M, 52 MV, 52 MB, 123/52 MC

[56] References Cited

U.S. PATENT DOCUMENTS

| | | | |
|---|---|---|---|
| 1,893,502 | 1/1933 | Kuehn | 123/52 M |
| 2,806,457 | 9/1957 | Moseley | 123/52 MV |
| 2,835,235 | 5/1958 | Gassmann | 123/52 M |
| 2,947,293 | 8/1960 | Arkus-Duntov | 123/52 MV |
| 3,561,408 | 2/1971 | Weiand | 123/52 MV |
| 3,875,918 | 4/1975 | Loynd | 123/52 M |

FOREIGN PATENT DOCUMENTS

| | | | |
|---|---|---|---|
| 1009429 | 5/1957 | Fed. Rep. of Germany | 123/52 M |
| 2249733 | 4/1974 | Fed. Rep. of Germany | 123/52 MB |
| 769041 | 2/1957 | United Kingdom | 123/52 M |

Primary Examiner—Charles J. Myhre
Assistant Examiner—Craig R. Feinberg
Attorney, Agent, or Firm—Thomas E. Beall, Jr.

[57] ABSTRACT

The runners of the intake manifold between the fuel-air mixture device and the valve ports of the head of an internal combustion engine are tuneable to a particular engine and/or RPM range either manually or automatically by moving at least one wall of each runner inwardly and outwardly to correspondingly decrease and increase the flow through cross-sectional area along the runner. Manual adjustments may be made for particular running conditions or engine component combinations, and automatic adjustments may be made in correspondence with changes in engine speed during operation by vacuum controls, throttle linkage, or electrical controls, for example.

12 Claims, 9 Drawing Figures

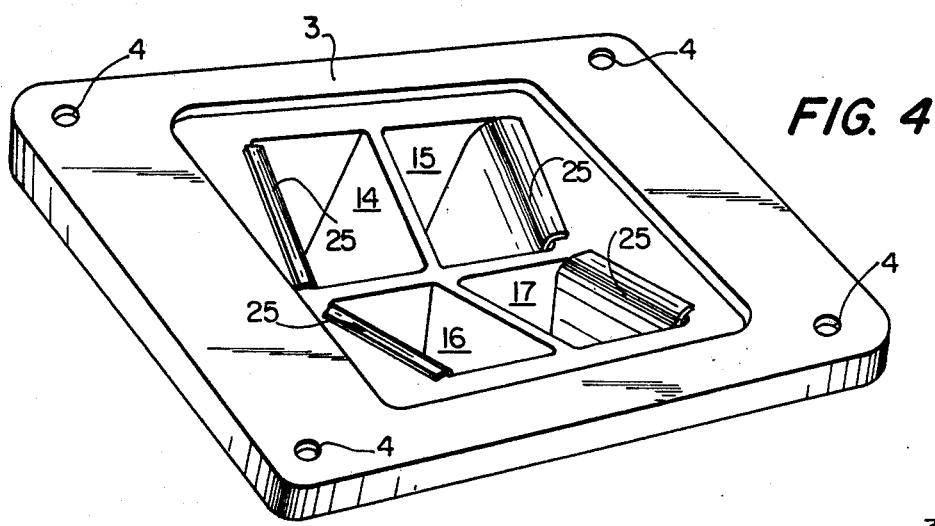
FIG. 4
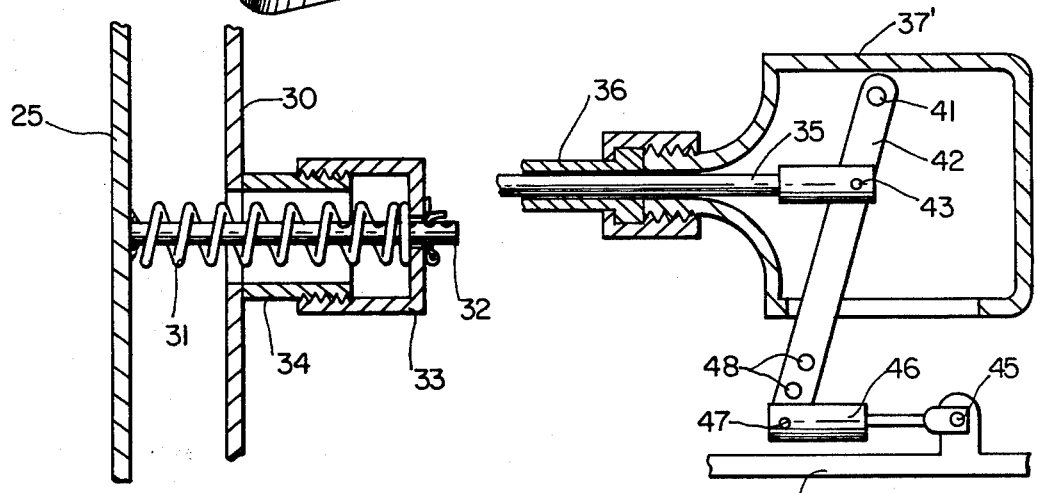
FIG. 5
FIG. 7
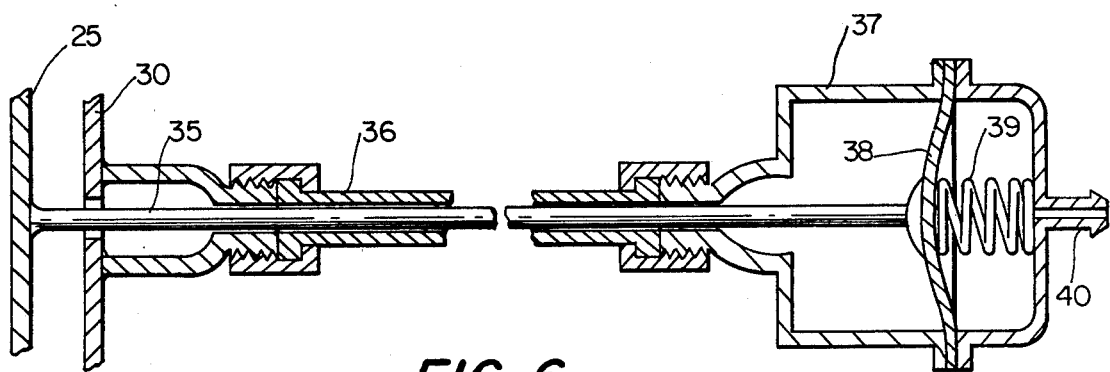
FIG. 6

TUNEABLE INTAKE MANIFOLD

This is a continuation, of application Ser. No. 760,402, filed Jan. 18, 1977, now abandoned.

BACKGROUND OF THE INVENTION

The present invention relates to the design of the runners of intake manifolds between the air-fuel mixture device and the valve ports of an internal combustion engine to improve the performance of the engine.

In the past, intake manifolds have been originally designed for certain conditions, usually relating to a compromise with respect to different engine components with which the intake manifold is to be used, or speed ranges. For example, some large engine manufacturers use the same intake manifold for their full range of engine sizes, even though the engine displacement may substantially double over the range of engine sizes. It is therefore seen, that the intake manifold common to this wide range of engines cannot operate as efficiently with respect to the individual engines as it would if it were specifically designed for such engine. However, the advantages of manufacturing and stocking only a single intake manifold are the advantages of such a system. Even if a single manifold was designed specifically for a single engine, it would operate most efficiently at only one speed. Cars that are used for local travel and low speeds would have different intake manifold requirements than the same cars used for high speed travel, or even for racing at very high engine speeds with respect to providing the most efficient intake manifold runner construction. In general, the higher the engine speed, the larger should be the intake manifold runner through flow cross-sectional area.

SUMMARY OF THE INVENTION

It is an object of the present invention to overcome the disadvantages mentioned above with respect to the prior art by providing an intake manifold having runners between the air-fuel mixture device and the valve ports of an internal combustion engine, wherein the runners may be manually or automatically adjusted for efficient operation with respect to specific engine component combinations and engine speeds.

The cross-sectional area of each runner is adjusted throughout its extent by moving one of its walls toward and away from the flow passage, which movement is accomplished either manually or automatically. The manual adjustment may be preset prior to operation, or controlled from the interior of the car, and the automatic adjustment may be according to manifold vacuum, throttle linkage movement, or electrical impulses related to throttle position or engine speed, for example.

There are two main reasons for providing a tuneable intake according to the present invention, namely: (1) for convenience—so that one intake manifold can be used on an engine that is being used under various conditions. For example, for dragstrip usage, the manifold would be adjusted to exactly match the particular engine set up, the weather and track conditions. With respect to stockcar racing, for example NASCAR, one manifold would be adjusted with respect to the long or short tracks. With respect to street-strip usage in racing, the engine could be adjusted for street efficiency and low engine speeds or for track efficiency and high engine speeds quickly and easily according to the particular usage on any given day or time. Also, one intake manifold could be stocked for a wide range of engines. More specifically, one engine manufacturer employs block and head combinations that may be combined to form the following engine sizes: 262, 283, 327, 350 and 400 cubic inches, but only one 2-barrel intake manifold is used for all of these engine combinations. With the present invention, such a single intake manifold could be adjusted so that its runners would be effectively designed for the specific cubic inch displacement with which it is used. (2) For a specific engine, the intake manifold could be tuned throughout the RPM range during usage either manually or automatically so as to obtain the maximum performance potential of the engine with respect to each engine speed. This would have the desirable results of reducing pollution, increasing engine efficiency with respect to gas mileage, increasing engine power for any particular setting, and generally improving performance.

Further objects, features and advantages of the present invention will become more clear from the following detailed description of the drawings.

BRIEF DESCRIPTION OF THE DRAWINGS

FIG. 4 is a partial perspective view generally taken downwardly as shown by arrows and IV—IV of FIG. 1;

FIG. 5 is a partial cross-sectional view showing one form of manual adjustment;

FIG. 6 is a partial cross-sectional view showing one form of automatic vacuum adjustment;

FIG. 7 is a partial cross-sectional view showing one form of throttle linkage automatic adjustment;

DETAILED DESCRIPTION OF THE DRAWINGS

The present invention may be used with respect to the tuning of the intake runners for intake manifolds extending between the air-fuel mixture device and the valve ports of an internal combustion engine, and may specifically be used with respect to multiple or single carburetor intake manifolds, fuel injection intake manifolds, V-cylinder arrangements or inline cylinder arrangements, and with respect to reciprocating or rotary piston engines, for example. A specific embodiment of the present invention will be described with respect to an intake manifold to be used between two carburetors and a V-8 engine. Such an intake manifold is shown in perspective in FIG. 1, and since both the carburetors and other engine components can be of any type and the specific embodiment is shown with respect to a conventional well known engine construction, such other components will not be shown in detail.

Figure 1:
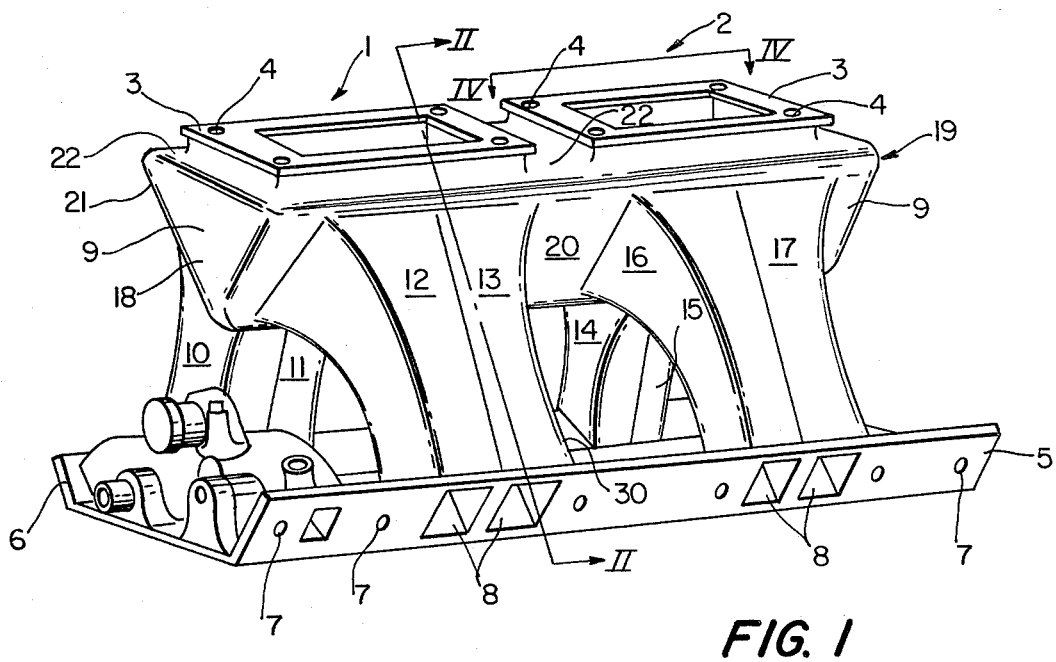
FIG. 1 is a perspective view of a preferred embodiment of the present invention as it relates to an intake manifold to be used with a V-8 engine employing two carburetors.

As shown in FIG. 1, the intake manifold includes a first mounting 1 for a first carburetor and a second mounting 2 for a second carburetor, each of which employs a mounting flange 3 having a pattern of bolt holes 4 to be used in securing the carburetors on the top of the manifold. The lower portion of the intake manifold has opposite flanges 5 and 6 at its lower portion with a plurality of bolt holes 7 to be used in mounting such flanges 5, 6, with a manifold gasket (not shown) on to the heads of a V-8 engine so that the intake ports 8 align with the intake ports (not shown) of the heads. As shown, there are four intake ports 8 on one side and four intake ports correspondingly on the other side (not shown) to respectively feed the air-fuel mixture to the eight intake valves of the eight cylinders of the engine. The first carburetor (not shown) would feed the air-fuel mixture into the opening in the first mounting 1 downwardly into the plenum chamber 9, from where the mixture would primarily pass through the intake runners 10, 11, 12, 13 to the corresponding ports 8 at the lower end of each of such runners. In a similar manner, the second carburetor would feed the air-fuel mixture through the opening in the second carburetor mounting 2 into the plenum chamber 9 where it would pass through the four individual intake runners 14, 15, 16, 17 to the respective intake ports 8.

Figure 2:
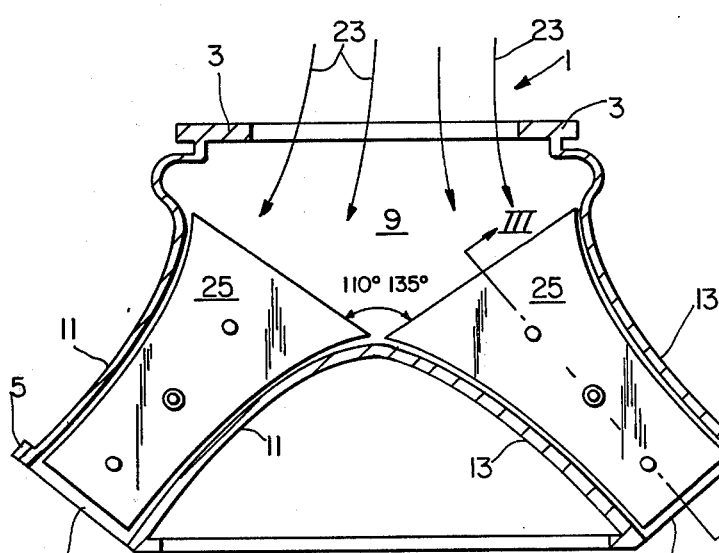
FIG. 2 is a cross-sectional view taken along line II—II of FIG. 1.

As shown most clearly in FIGS. 1 and 2, the plenum chamber 9 is defined by a generally horizontally extending pair of top flanges or carburetor mountings 3, end walls 18, 19, the inlet openings of the intake runners 10–17, opposite side walls 20, 21 that extend between the end walls 18, 19 and the openings for the intake runners 10–17, and top wall 22 that extends between the end walls 9 and the openings in the carburetor mounting flanges 3. It is seen from FIG. 2 that the openings for the intake runners 12, 13, 16, 17 are generally formed in one plane with the side wall 20, which plane intersects with an angle within the range of 110° to 135° the plane having therein the intake openings for the intake runners 10, 11, 14, 15 and side wall 21. With such an arrangement, the air-fuel mixture comes downwardly from the openings in the flanges 3 to smoothly divide within the plenum chamber 9 and pass into the intake runners. Such a design provides a particularly turbulence free intake flow between the air-fuel mixture device and the intake runners as shown by arrows 23. The dimension 24, by way of specific example, may be 2½ to 4 inches, depending upon the above mentioned angle.

According to the present invention, each intake runner 10, 11, 12, 13, 14, 15, 16, 17, regardless of how many intake runners there are, is provided with a side wall 25 that preferably extends for the full length of the intake runner and preferably for a full transverse dimension of the intake runner throughout its length. Such side wall is mounted for adjustment transversely inwardly and outwardly with respect to the flow direction of the fuel mixture through the intake runner to correspondingly decrease and increase the through flow cross-sectional area. Such an adjustment tunes the intake runner to a specific engine design. Specifically, when converting the intake manifold from an engine of a specific cubic inch displacement to an engine of a larger cubic inch displacement, other factors being equal between the engines, the side wall 25 would be moved outwardly to increase the through flow cross-sectional area of each intake runner. Similarly, to tune the intake runner to high engine speed operation, the side wall 25 would be moved outwardly to increase the intake runner through flow cross-section. Such adjustment may be accomplished manually or automatically as will be set forth hereinafter with respect to specific variations of the side wall adjustment mechanism.

Figure 3:
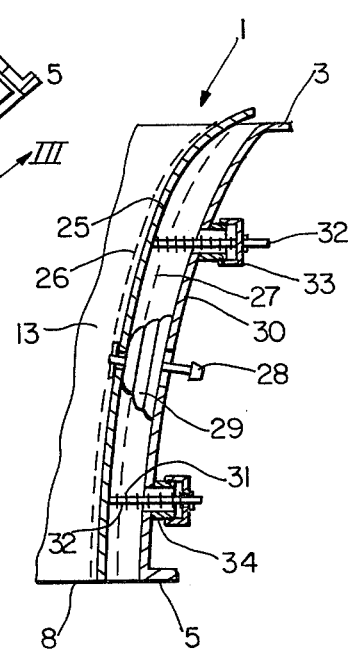
FIG. 3 is a cross-sectional view taken along line III—III of FIG. 2.

FIG. 3 shows a mechanism for moving the intake runner side wall 25 inwardly (to the left) and outwardly (to the right) with respect to the intake runner 13, between an extreme inward position shown by dotted line 26 and an extreme outward position shown by dotted line 27. This mechanism is operated automatically according to intake manifold pressure. The intake manifold pressure is conducted through a suitable tubing or pipe to the coupling 28, which may be of standard design, leading to a bellows or other expansible chamber device 29 that is operatively inserted between the fixed side wall 30 of the intake runner 13 at preferably the centroid of the movable side wall 25. With increased vacuum, that is decreased pressure, within the intake manifold generally corresponding to high engine speed operation, the expansible chamber device 29 will decrease in volume and draw the movable side wall 25 towards the fixed side wall 30 and correspondingly increase the through flow cross-sectional area of the intake runner 13 against the constant bias of springs 31, and with decreased vacuum in the intake manifold, the expansible chamber device 29 will be permitted to expand as the movable side wall 25 moves inwardly towards the position 26 under the bias of springs 31. Each spring 31 extends around a guide pin 32 that is secured to the side wall 25 and freely extends through an opening in the cap 33. One end of the spring 31 abuts against the side wall 25, whereas the other end of the spring 31 abuts against the inside of the cap 33, with the spring under compression. Each cap 33 is threaded onto a correspondingly threaded sleeve 34 that is welded or otherwise fixed to the stationary wall 30 of the runner 13 about a suitable opening in such wall 30. In this manner, the cap 33 may be screwed inwardly and outwardly to change the bias of the spring 31 and accordingly change the position of the movable wall 25 for a specific intake manifold pressure.

Accordingly, the device of FIG. 3 may be manually adjusted, for each runner, by screwing the caps 33 inwardly or outwardly to correspondingly change the bias of the springs 31 to tune the engine, preferably with instruments, to the most effective positioning of the wall 25 for a representative engine speed. Thereafter, with the engine being in use, adjustment of the movable wall 25 of each intake runner 10–17 will occur automatically and smoothly over the range of positions from 26 to 27 according to intake manifold pressure and correspondingly according to engine speed. Also, if the intake manifold is used with an engine of different displacement or other characteristics, such may be compensated for by screwing the caps 33 inwardly or outwardly a corresponding amount.

Although not shown, it is understood that in the embodiment, with respect to all of the variations, the space between the fixed wall 30 and the movable wall 25 may be closed by the configuration of either the top or bottom end of the movable wall 25, or a flexible seal, if found desirable or necessary to prevent the flow of a substantial quantity of air-fuel mixture through such space.

As a variation of the adjustment mechanism shown in FIGS. 3 and 5, the expansible chamber device 29, 28 may be eliminated to provide only the manual adjustment of elements 31, 32, 33, 34.

As a further or alternative adjustment shown in FIGS. 3 and 5, the pin 32 is provided with a plurality of through holes extending along its length, so that a cotter pin can be inserted through one such hole on the outside of the cap 33 to vary the spacing between the walls 25 and 30 in the step-wise adjustment.

In FIG. 6, the adjustment between the movable wall 25 and the fixed wall 30 is responsive to carburetor vacuum and/or intake manifold pressure, with the inner cable 35 of a Bowdin wire type adjustment being secured to the movable wall 25 and the outer sleeve 36 of such cable construction being secured to the fixed wall 30 at one end. The opposite end of the sleeve 36 would be secured to an expansible chamber device 37 while the opposite end of the cable 35 is secured to the movable element 38 of such expansible chamber device 37. The movable element 38 is preferably a flexible diaphram spring biased towards the left by a spring 39 and moved towards the right under vacuum introduced through standard coupling 40. The expansible chamber device 37 may serve to operate all or a plurality of the intake runners by merely driving a plurality of such cables 35, 36 from a single diaphragm 38. Preferably, the cable 35 and sleeve 36 are flexible to facilitate assembly.

In place of the expansible chamber device 37 shown in FIG. 6, the mechanism of FIG. 7 may be employed, and comprises a chamber 37' forming a fixed pivotal mounting 41 for a lever 42 pivotally connected at a mid portion 43 to the cable 35 and operatively pivoted by the throttle mechanism 44. The throttle mechanism 44 will generally reciprocate along its length and is provided with a pivotal mounting 45 for one end of an adjustable length linkage 46 that has its opposite end pivotally mounted at 47 to the lever 42. The pivotal mounting 47 is adjustable in that it may be provided at any one of the plurality of holes 48 along the length of the lever 42. One or a plurality of cables 35 may be operated by the mechanism 37' of FIG. 7, to correspondingly operate one or a plurality of movable walls of intake runners. It is thus seen that with movement of the throttle linkage 44 in a direction to increase the throttle opening and correspondingly increase the speed of the engine, the movable side wall 25 will be moved towards the fixed side wall 30 to increase the through flow cross-sectional area.

Figure 8:
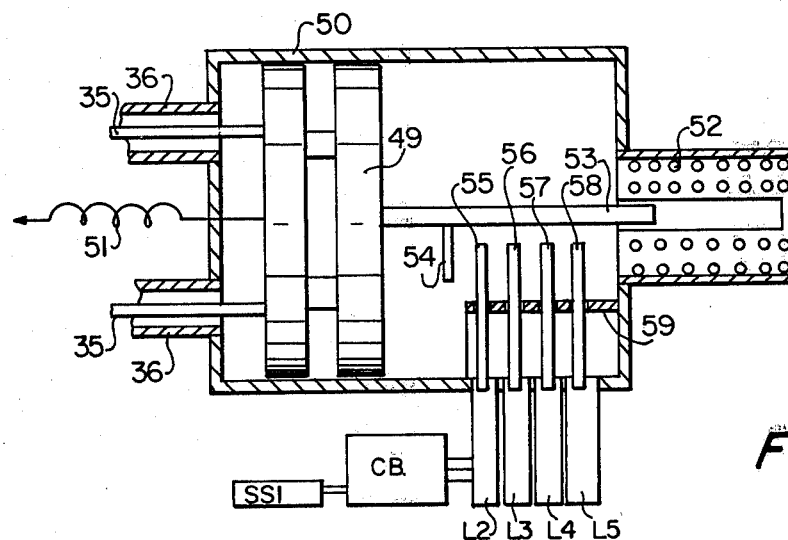
FIG. 8 is a cross-sectional view, partly schematic, showing the mechanism for automatic electrical adjustment.
Figure 9:
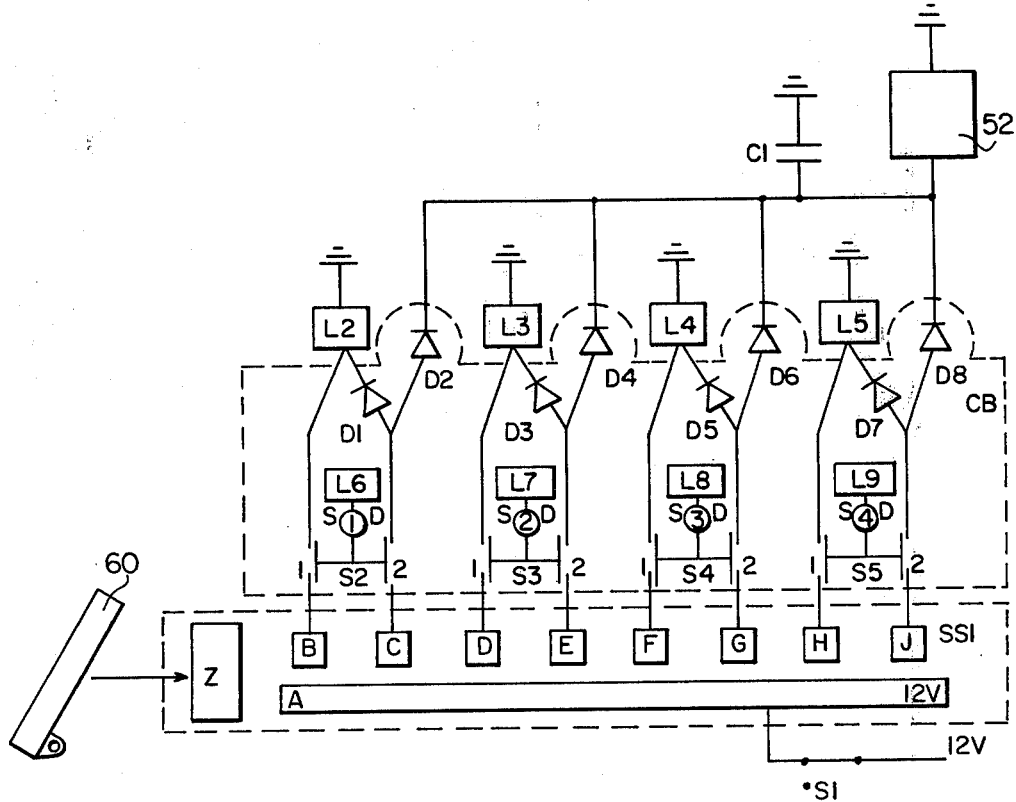
FIG. 9 is a schematic electrical diagram showing components used in the system of FIG. 8.

An automatic electrically controlled mechanism for adjusting the intake runners is shown in FIGS. 8 and 9. In FIG. 8, the flexible cables 35, that are secured to movable walls 25 (not shown) are driven back and forth with respect to the sleeve 36 (which is connected to the fixed walls 30, not shown) by means of a piston 49 connected to the cables 35 and a guide cylinder 50 connected to the sleeves 36. The piston 49 is biased towards the left by means of tension spring 51 and drawn towards the right by means of an electromagnetic coil 52 acting upon an armature 53 that is secured to the piston 49. The armature 53 further has a depending locator pin 54 that cooperates with a plurality of abutments 55, 56, 57, 58 that determine the range of movement of the locator pin, piston 49, cable 35 and movable wall 25. The pins 55-58 are moved between their positions shown in full lines in FIG. 8 where they are in interference with the locator pin 54 to positions lowered to guide plate 59 where they are out of the path of travel of locator pin 54, by means of electromagnetic relays L2, L3, L4, L5, respectively. The relays are controlled by means of a circuit board CB, which is in turn actuated by a slide switch SS1.

With the mechanical linkage in the position of FIG. 8, which corresponds to the movable side wall 25 being in position 26 of FIG. 3, the accelerator linkage 60 of FIG. 9 is moved towards the right to correspondingly drive movable slide electrical contact Z towards the right to where it bridges elongated contact A and contact B, which will supply the battery voltage through a switch S1, which may be the ignition switch, contact A, contact Z, contact B and bi-stable switch S2. If bi-stable switch S2 is in position to close contacts 2, the current will not travel further, but if the bi-stable switch S2 is in position to close contacts 1, current will be conducted to the bi-stable switch to move it to a position to open contacts 1 and close contacts 2. With further movement of the slide contact Z to bridge contacts A and C, the voltage will be applied through contacts A C and contacts 2 of the bi-stable switch, through diode D1 to relay coil L2 that will be energized to withdraw pin 55 out of the way of pin 54, and simultaneously the voltage will be applied through diode D2 to coil 52. Energization of coil 52 will draw the armature 53 towards the right, in FIG. 8, to where the locater pin 54 will engage abutment 56. At the same time, the voltage applied to closed contacts 2 of bi-stable switch S2 will be applied through a delay to the relay coil L6 of the bi-stable switch, which after the delay will change the contacts so as to open contacts 2 and close contacts 1, but not until after there has been a sufficient delay to permit withdrawal of abutment 55 and movement of pin 54 into engagement with abutment 56. When contacts 2 open, the relay coil L2 will immediately be deenergized to return the abutment 55 to its position shown in FIG. 8, which will result in the locater pin 54 being trapped between the abutments 55 and 56. At the same time, the opening of contacts 2 for the bi-stable switch S2 will after a delay cause deenergization of the coil 52; this delay is caused by the capacitor C1 discharging through the coil 52 to keep it energized until the relay coil L2 has been deenergized sufficiently to permit pin 55 to return to its position of FIG. 8 before the locater pin 54 may be moved by means of the bias of spring 51. As a result, the intake runner will be adjusted in effective cross-sectional area by the movement of piston 49, cable 35 and movable wall 25, and maintained in such adjustable position by means of the abutments 55, 56 trapping the locater pin 54; at the same time, the bi-stable switch will remove the coils from the electrical supply so as to eliminate any drain on the system battery. The electrical circuit will not be energized in any way until the throttle mechanism is moved further towards the right to move the slidable contact from contact C to contact D to repeat the operation with respect to the bi-stable switch S3 having its relay coil L7 supplied for a delay. The operation and construction of the remaining elements are substantially the same as previously described, so that as the throttle is fully opened, the movable slide Z will move to progressively connect contacts D, E, F, G, H, J, to the voltage supply contact A for successively withdrawing abutment 56, moving piston 49 so as to position pin 54 against abutment 57, release abutment 56 to return to its illustrated position in FIG. 8 and trap the locator pin 54 between abutments 56 and 57, remove coil 52 from a circuit, energize relay L4 to withdraw pin 57, energize coil 52 to move piston 49 and pin 54 to the right so as to engage pin 54 against abutment 58, deenergize relay coil L4 to return abutment 57 to its position of FIG. 8 and trap pin 54 between abutments 57 and 58, deenergize coil 52 to remove it from the circuit, energize coil L5 to withdraw pin 58, energize coil 52 to move piston 49 and pin 54 to the right to where pin 54 moves beyond abutment 58, deenergize relay coil L5 to return abutment 58 to its illustrated position and prevent pin 54 from returning to the left under the influence of the spring 51, and removing coil 52 from the circuit.

At the position of full throttle opening or any intermediate position wherein pin 54 is trapped to the right of abutment 58 or trapped between abutments, return of the throttle linkage 60 towards its closed position would move slide contact Z towards the left, and for example movement of the slide contact Z from bridging contacts G and A to where it would bridge contacts A and F would supply a voltage through closed contacts 1 of bi-stable switch S4 to energize relay coil L4 and withdraw abutment 57 to permit the spring 51 to move the locater pin 54 past abutment 57 into engagement with abutment 56; after the delay, the bi-stable switch coil L8 would open the contacts 1 and close the contacts 2 of bi-stable switch S4 to return the abutment 57 to its position illustrated in FIG. 8 and remove the components from the circuit to prevent battery drain. With further movement of the throttle linkage towards the closed position, the slide contact Z would move to bridge contacts A and E, but no voltage would be supplied to the circuit, because bi-stable switch S3 would be in a position so as to maintain contacts 2 open. Further movement of the throttle towards its closed position would cause slide contact Z to bridge contacts A, D and supply voltage through the closed contacts 1 of bi-stable switch S3 for energizing relay coil L3 and moving abutment 56 out of the way of locater pin 54 so that locater pin 54 may move to the left under the influence of spring 51 against abutment 55. The functions would be repeated with continued movement of the throttle linkage 60 towards the closed position of the throttle.

While the present invention has been described with respect to a preferred embodiment and variations, with advantageous details being set forth, it is to be understood that further embodiments, modifications and variations are contemplated according to the broader aspects of the present invention, all as determined by the spirit and scope of the following claims.

What is claimed is:

1. An intake manifold for a reciprocating piston internal combustion engine having at least two combustion cylinders arranged in a V-shape with respect to a cross-section perpendicular to a crank shaft, comprising:
    a planar intake mounting for at least one air-fuel mixture device;
    opposed planar mountings for the intake valve ports of said cylinders;
    a plenum chamber adjacent said air-fuel mixture intake mounting to directly receive the air-fuel mixture from said air-fuel mixture device;
    at least two intake runners each having a straight central axis and forming an air-fuel passageway opening at one end into said plenum chamber and opening at its opposite end into the respective one of the mountings for the intake ports;
    said plenum chamber being triangular shaped in said cross-section taken perpendicular to the crank shaft orientation with said intake mounting extending generally horizontally and the openings of said intake runners at said one end extending in respective planes intersecting each other at an obtuse angle within the range of 110° to 135°;
    said plenum chamber being defined by two planar, solid, triangular end walls parallel to each other and perpendicular to the crank shaft orientation, two opposed, planar, rectangular side walls joined to each other along a common side edge and having their opposite end edges joined to respective ones of said triangular end walls, and a planar, rectangular, horizontal top wall joined at its edges respectively to said side wall and end wall remaining edges;
    said side walls having therein said openings of said intake runners and said top wall having therein said intake mounting;
    the planes of said side walls intersecting each other at an obtuse angle within the range of 110° to 135°;
    a central generally horizontal plate rigidly interconnecting said mountings for the intake valve ports so that they are generally parallel to respective ones of said side walls;
    the cross-sectional shape of each of said intake runners taken perpendicular to its central axis being substantially rectangular throughout its length; and
    said passageway central axes extending generally perpendicular to the plane of their plenum chamber openings at the one end and generally perpendicular to the plane of their intake port openings at the opposite end, respectively.

2. An intake manifold for an engine having at least two working cylinders with respective valve intake ports, comprising:
    an inlet coupling at one end of the manifold for connection to a source of working fluid and at least two outlet couplings at an opposite end for connection to the intake port of the engine;
    a plenum chamber adjacent said inlet coupling to directly receive the working fluid from said source;
    at least two intake runners each forming a passageway opening at one end directly into said plenum chamber and opening at its opposite end into the respective one of the intake ports;
    each of said intake runners being defined by and having side walls forming an inlet passageway having a central axis extending along the path of air flow from the passageway;
    at least a portion of one of said walls of each said passageways being mounted for movement towards and away from said central axis of its passageway to effectively decrease and increase the through flow cross-sectional area as measured in a plane perpendicular to said axis, respectively; and
    means for maintaining said movable wall in an adjusted position.

3. An intake manifold for an internal combustion engine having an intake valve port, comprising:
    an air inlet coupling at one end of the manifold for connection to a source of at least air and an outlet coupling at an opposite end for connection directly to the intake valve port of the engine;
    at least one intake runner having opposite open ends, connected at one end to receive said air from said air inlet coupling and connected at its opposite end to said outlet coupling and thereby directly to said engine for conducting said air to the intake valve port of the engine;
    said intake runner being defined by and having side walls forming an inlet passageway having a central axis extending along the path of air flow through the passageway;

at least one of said walls of said passageway being mounted for movement towards and away from said central axis of said passageway to effectively decrease and increase the through flow cross-sectional area as measured in a plane perpendicular to said axis throughout the length along said passageway, respectively; and means for maintaining said movable wall in an adjusted position.

4. The intake manifold of claim 3, wherein said manifold includes a plenum chamber, a plurality of separate intake runners, each of said intake runners being provided with a movable side wall and maintaining means, and said air inlet coupling of each of said runners directly opening into said plenum.

5. The intake manifold of claim 3, wherein said maintaining means includes means for manually moving said movable wall to different positions and locking said movable wall at each of said positions.

6. The intake manifold of claim 5, wherein said maintaining means includes spring means biasing each of said movable walls in one direction and manually adjustable means for moving each of said movable walls in the other direction.

7. The intake manifold of claim 3, wherein said maintaining means automatically adjusts the positioning of said movable wall according to variations in engine speed so as to increase the effective through flow cross-sectional area of each intake runner with increased engine speed.

8. The intake manifold according to claim 7, wherein said maintaining means includes expansible chamber means for converting variations in intake manifold pressure to corresponding movement of said movable wall so as to move said movable wall to increase the effective through flow cross-sectional area of its intake runner with a decrease in intake manifold pressure.

9. The intake manifold of claim 7, wherein said automatic means includes linkage means for transferring mechanical movement of the engine throttle linkage to corresponding movement of said movable wall.

10. The intake manifold according to claim 9, wherein said linkage means is adjustable.

11. The intake manifold according to claim 7, wherein said maintaining means includes electromagnetic means for moving said movable wall in one direction, a plurality of stops contolling the range of movement of said movable wall under the influence of said electromagnetic means, electrical means for selectively withdrawing said stops to a position wherein they do not affect the range of movement of said movable wall under the influence of said electromagnetic means and switch means responsive to engine condition change related to engine speed to successively withdraw said stops and correspondingly energize said electromagnetic means.

12. The intake manifold according to claim 11, wherein delay switch means are provided to automatically deenergize said electromagnetic means and the electrical means for withdrawing said stops after a predetermined delay from the energization by said switch means.

* * * * *